United States Patent

Ohtsu et al.

[11] Patent Number: 6,138,415
[45] Date of Patent: Oct. 31, 2000

[54] AUTOMOBILE HAVING DOOR SEAL STRUCTURES

[75] Inventors: Seiichi Ohtsu; Toshio Aoki, both of Fujisawa, Japan

[73] Assignee: Isuzu Motors Limited, Tokyo, Japan

[21] Appl. No.: 09/077,559

[22] PCT Filed: Sep. 25, 1997

[86] PCT No.: PCT/JP97/03410

§ 371 Date: Nov. 12, 1998

§ 102(e) Date: Nov. 12, 1998

[87] PCT Pub. No.: WO98/14341

PCT Pub. Date: Apr. 9, 1998

[30] Foreign Application Priority Data

Oct. 4, 1996 [JP] Japan .................................... 8-264235

[51] Int. Cl.[7] .............................. E06B 7/16; B60J 10/08
[52] U.S. Cl. ...................... 49/490.1; 296/146.9; 296/198
[58] Field of Search ............................. 49/490.1, 475.1, 49/498.1, 440; 296/146.9, 198

[56] References Cited

U.S. PATENT DOCUMENTS

| | | | |
|---|---|---|---|
| 4,454,688 | 6/1984 | Rest et al. ........................ | 49/490.1 X |
| 4,549,761 | 10/1985 | Lee et al. .......................... | 49/490.1 X |
| 5,347,758 | 9/1994 | Yamane ............................. | 49/490.1 X |
| 5,352,009 | 10/1994 | Takeuchi ........................... | 49/490.1 X |
| 5,369,914 | 12/1994 | Takeuchi ........................... | 49/475.1 X |
| 5,446,998 | 9/1995 | Arima ................................ | 49/490.1 |

*Primary Examiner*—Daniel P. Stodola
*Assistant Examiner*—Hugh B. Thompson
*Attorney, Agent, or Firm*—Antonelli, Terry, Stout & Kraus, LLP

[57] ABSTRACT

A seal structure for a vehicle door which stabilizes the appearance of the lip portion on the door and prevents the chipping of the flange tip portion on the side of the door. In a vehicle, a door (10) is mounted so as to cover the outer side of a fender (2). On the door (10) is mounted a weather strip (14) and a seal member (20) positioned facing the side of the fender (2). A flange portion (12) formed integrally with the door (10) is positioned so as to extend towards the fender (2). The seal member (20) includes a door fixing portion (22), a lip portion (21), and a cover portion (23), and is positioned so as to cover the flange portion (12) with the door fixing portion (22). An arch cover (3) is removably mounted to the portion of the fender (2) with which the lip portion (21) is contacted.

7 Claims, 3 Drawing Sheets

AUTOMOBILE HAVING DOOR SEAL STRUCTURES

TECHNICAL FIELD

The present invention relates to a seal structure for doors mounted on a vehicle, and more specifically, to a vehicle door having a seal structure for application to an open/close door portion of the vehicle.

BACKGROUND OF THE INVENTION

Conventional one-box type cars (cab over engine wagons, vans and so on) or vehicles having a wheel arch formed on the open/close portion of the door require a door seal for preventing the intrusion of water, dirt and the like. The art related to such seal structure is disclosed, for example, in Japanese Utility-Model Publication No. 58-73087.

The publication discloses, as shown in FIG. 4, a seal structure for a door 32 in a vehicle where the lower end portion of the door 32 is positioned so as to cover the outer side of a fender 31 in the vehicle body 30. In the seal structure, a main weather strip 33 is mounted to an inner circumferential surface of the door 32, and a lower weather strip 34 is mounted to an inner surface of the lower end portion of the door 32 so as to contact the outer side of the fender 31, wherein a protector 35 for covering the lower end rim of the door 32 is formed integrally with the lower weather strip 34.

However, it was difficult by the known art disclosed in the above publication to form the lip 34a covering the lower end portion of the door 32 which has a good and definite appearance. The reason for such unattractive appearance was caused by an uneven gap formed between the tip of the lip 34a and an outer panel 32a when mounting the lip 34a.

Such problems could be prevented by bonding the tip, but this caused another problem of raising the manufacturing cost due to increased manufacturing steps.

SUMMARY OF THE INVENTION

The present invention is aimed at solving the above problems, by providing a vehicle having a stable appearance of the lip portion on the door, with a structure for preventing chipping of the flange tip portion mounted on the door side.

In order to solve the above problems,

The vehicle of the present invention comprises a door mounted so as to cover the outer side of a fender, the door comprising a weather strip, and a seal member mounted facing the fender side, wherein a flange portion formed integrally with the door is extended toward the fender, said seal member comprises a lip portion and a door fixing portion having a connecting groove, and said flange portion is connected to said connecting groove so as to be covered by said door fixing portion.

Further, the vehicle of the present invention comprises a structure with an arch cover that is removably mounted to the portion of the fender with which the lip portion is contacted when the door is closed.

The vehicle of the present invention further comprises a structure with a cover portion covering the door fixing portion that is formed to the seal member.

BRIEF DESCRIPTION OF THE DRAWINGS

Each of FIG. 1A

PREFERRED EMBODIMENT OF THE PRESENT INVENTION

The embodiment of the present invention will be explained hereinafter with reference to the accompanying drawings.

Figure 1A:
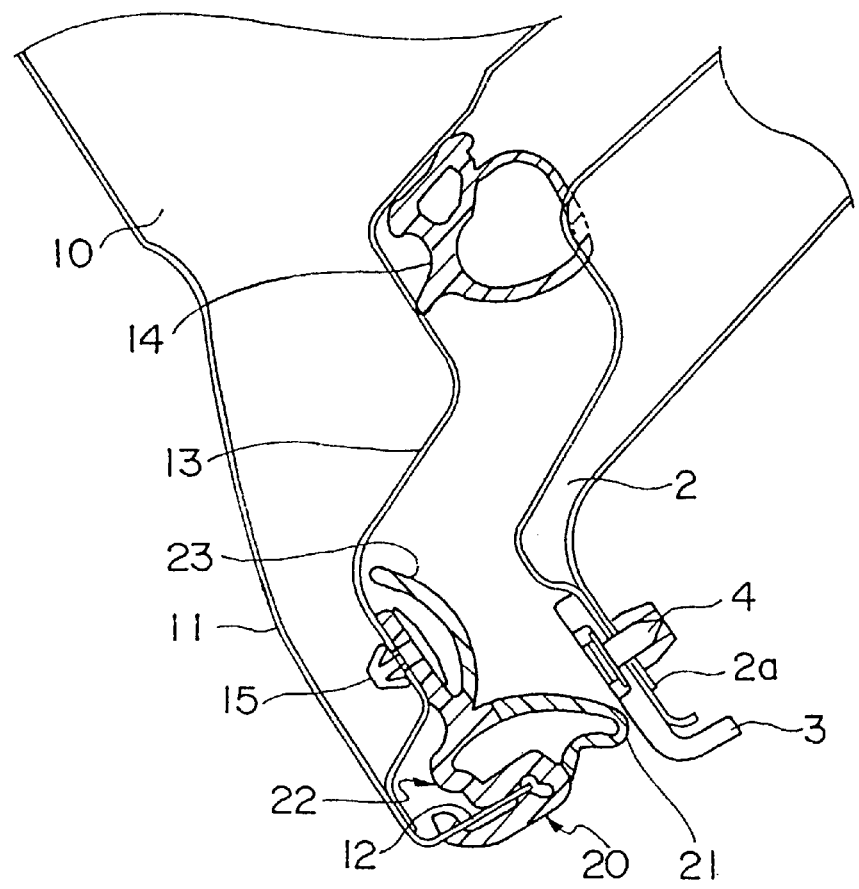
FIG. 1B is a cross-sectional view showing the outline of the door seal structure according to an embodiment of the present invention.
Figure 1B:
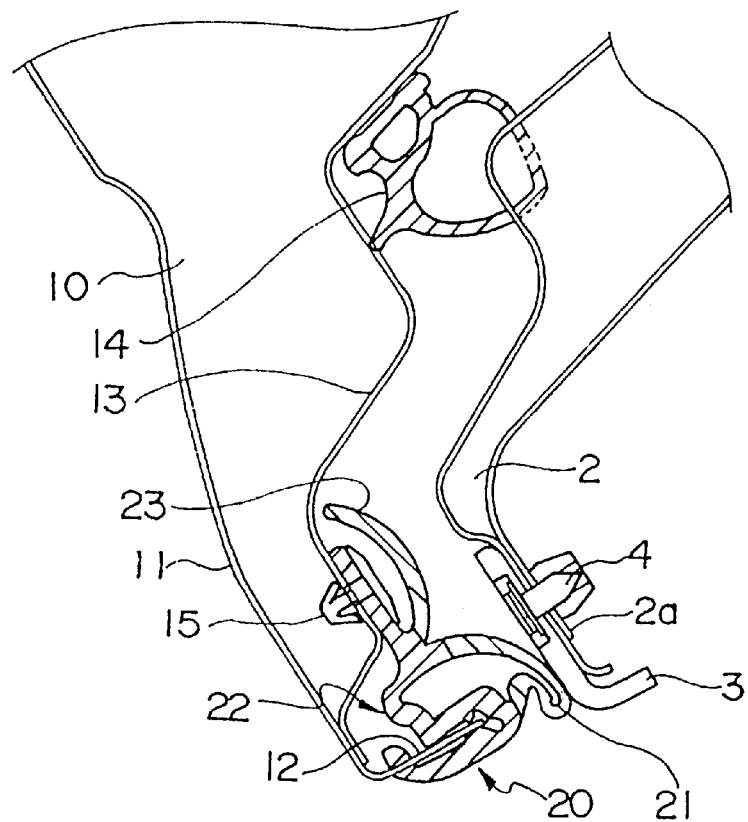
Figure 2:
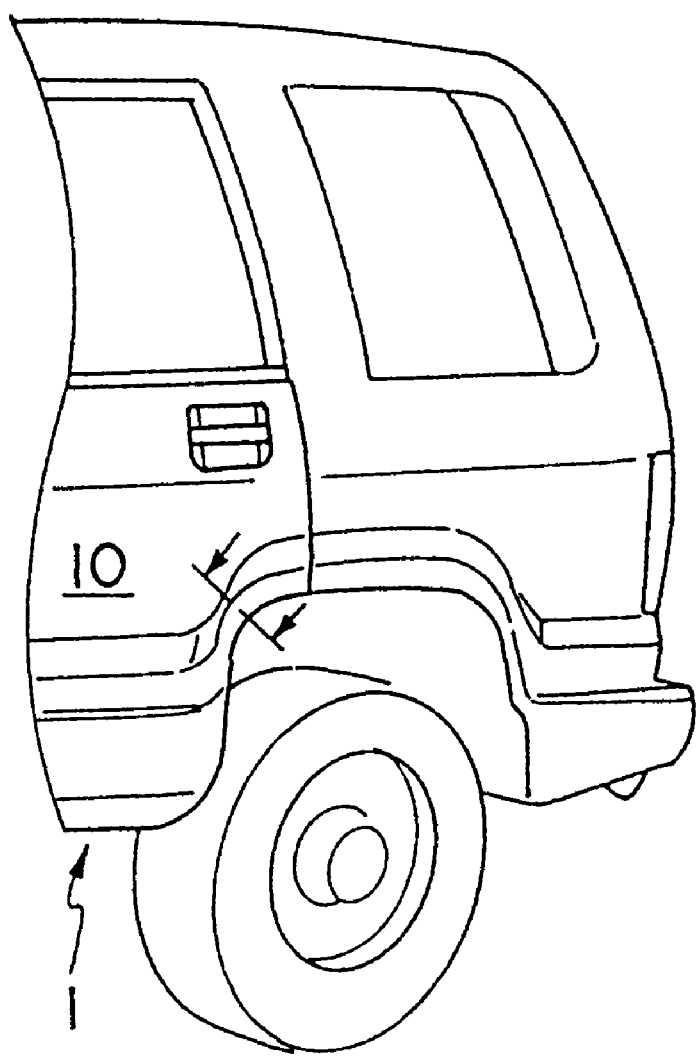
FIG. 2 is a partial side view of the same embodiment.

FIGS. 1 and 2 show a portion of a vehicle according to the embodiment of the present invention. A cab over engine-type light van is used in the embodiment as an example of the vehicle. A door 10 positioned on the rear half of a body 1 is formed so as to cover the outer side of a fender 2 positioned on the lower area of an opening in the body 1. Actually, as shown in FIGS. 1 and 2, the lower end portion of an outside panel 11 forming the door body of the door 10 is protruded, and along the edge of said outside panel, a flange portion 12 is formed integrally thereto.

More specifically, a weather strip 14 is mounted to the whole circumference of the inner side surface of an inside panel 13 of the door 10, and the weather strip 14 prevents rain water and the like from leaking into the interior of the vehicle.

Further, the tip portion of a clip (not shown) buried inside the weather strip 14 is fixed to said inside panel 13. The mounting could also be carried out by a bonding means instead of the clip.

On the other hand, on an arch-like end rim of the outside panel 11 which is positioned on the outer side of the door 10 from the mounting position of the weather strip 14, the tip of the outside panel 11 is bent in a right angle, forming the flange portion 12 integrally with the panel so as to have a fixed height.

A seal member 20 having a lip portion 21 integrally formed thereto so as to contact an end portion 2a of the fender 2, is mounted to the flange portion 12. When the door 10 is shut, the lip portion 21 of the seal member prevents muddy water from sticking to the outer side of the fender 2 by closing the gap between the peripheral portion of the door 10 and the fender 2, as shown in FIG 1B.

The seal member 20 is for mounting to the flange portion 12 formed by bending the rim of the outside panel 11 forming the door 10. The structure of the seal member 20 will now be explained in detail.

Figure 3:
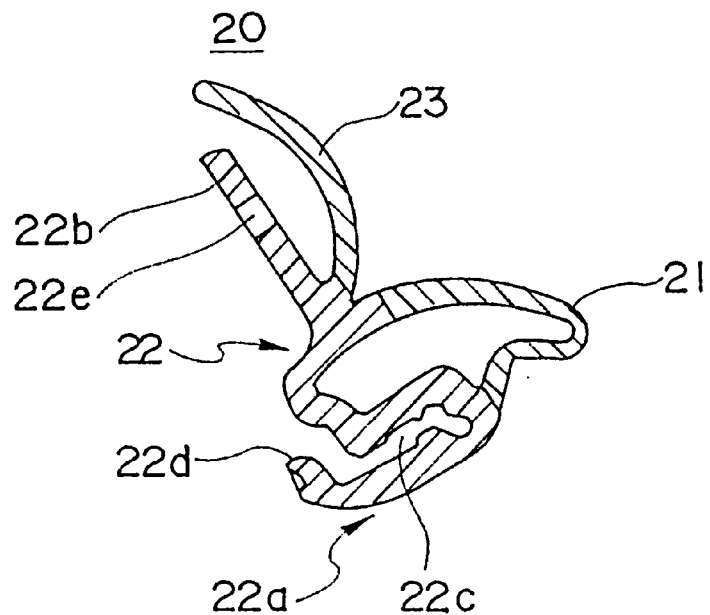
FIG. 3 is a cross-sectional view showing the seal member 20 of the same embodiment.
Figure 4:
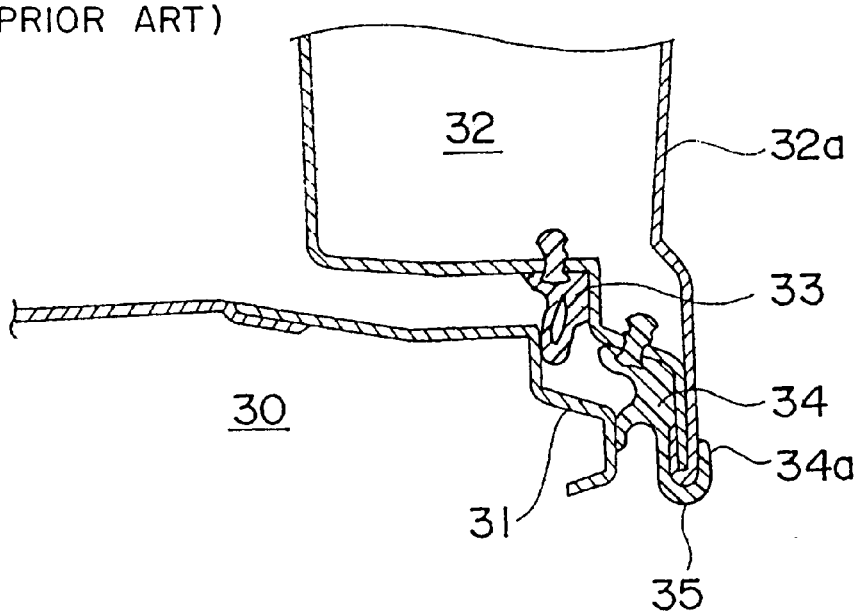
FIG. 4 is a cross-sectional view showing the door seal structure of the prior art.

The seal member 20 comprises a door fixing portion 22, a lip portion 21 and a coverportion 23 as shown in FIG. 3, wherein the door fixing portion 22 is formed of a hard synthetic resin and includes a mounting portion 22a for mounting to the flange portion 12 and a mounting portion 22b for mounting to the inside panel 13.

The mounting portion 22a is formed with a connecting groove 22c, for covering the flange portion 12, and a protrusion 22d.

The protrusion 22d is inserted into a mounting hole (not shown) formed in the flange portion 12 and connected thereto. As was explained, the seal member 20 works as a protector covering the flange portion 12.

On the mounting portion 22b of the seal member 20 is formed a mounting hole 22e for mounting the member to the inside panel 13 by a clip 15, and the clip 15 is inserted through the mounting hole 22e for mounting to the inside panel 13. In other words, the seal member 20 is securely mounted to the door 10 by connecting the flange portion 12 to the connecting groove 22c, and fixing the mounting portion 22b by the clip 15 to the side panel 13 of the door.

The lip portion 21 of the seal member 20 is formed in a curved shape by a synthetic resin thin plate having a relatively high flexibility, and both ends thereof are fixed to the door fixing portion 22, being separated by a predetermined distance.

The space formed between the door fixing portion 22 and the lip portion 21 could either be open to outer air or sealed to form an airtight space. In either case, when the door 10 is shut and contacted to the lower portion of the fender 2 side, it is flexibly deformed as shown in FIG. 1B.

The cover portion 23 of the seal member 20 is a member for hiding the peripheral area of the clip 15 mounted to the mounting portion 22b, which provides a good appearance by being curved in an arc shape. As an example other than the present embodiment of the means to fix the seal member 20, a cored bar could be mounted thereto, or the tip of the mounting portion of the seal member 20 could be formed thinner to be fixed by a double coated adhesive tape (not shown).

The present embodiment not only provides a good appearance, since the lower surface of the mounting portion 22a in the seal member for covering the flange portion 12 is not deformed, but also provides a good sealing property, since the flange portion 12 is formed so as not to contact the side of the body.

On the other hand, in the position where the lip portion 21 of the seal member 20 contacts the fender 2 along the lower end, an arch cover 3 having an L-shaped cross-section is mounted integrally to the fender 2 by a mounting device 4, in the form of a screw or the like, enabling removal therefrom. Further, it could be formed so that the mounting position thereof may be changed according to need.

According to the above embodiment, the flange portion 12 of the door 10 is covered by the door fixing portion 22 of the seal member 20, thereby hiding the lip portion 21 when the door is closed. This provides an advantageous appearance. Further, since the connecting groove 22c and the protrusion 22d are formed on the seal member 20, the mounting operation can be simplified, thereby contributing to reduction of manufacturing cost.

Moreover, since the separately formed arch cover 3 is removably mounted to the fender 2 where the lip portion 21 of the door 10 is contacted, replacement of the arch cover is enabled. Further, the door fixing portion 22 is formed of a hard synthetic resin, and the lip portion 21 is formed of a flexible synthetic resin. This minimizes the deformation of the seal member 20, which leads to maintaining the advantageous appearance for a long time.

Even further, according to the present embodiment, the appearance disorder caused by the accuracy of unit members on the door or assembly dispersion could be prevented, and the assembling can be performed stably, which aids performance in resist chipping. Moreover, by forming the tip of the lip portion 21 of the seal member 20 thinner, the seal portion of the vehicle does not stand out, thereby enabling a good appearance.

Industrial Applicability

The present invention having the above structure is effective in the following points.

1. According to the invention of claim 1, the appearance of the lip portion on the door is stabilized, and the chipping of the flange tip portion could be prevented.

2. According to the invention of claim 2, in addition to the effects of claim 1, since the arch cover is removably mounted to the contact portion of the lip portion, the adjustment of the gap between the lip portion, or the replacement of the arch cover when broken may easily be performed.

3. According to the invention of claim 3, in addition to the effects of claims 1 and 2, since the cover portion for covering the door fixing portion is formed to the seal member, the door appearance when the door is opened could be improved.

What is claimed is:

1. A door seal structure on a vehicle having a fender, said door seal structure comprising:

a door mounted on the vehicle for movement between an open position, in which said door provides an opening for access to an interior of the vehicle, and a closed position, in which said door closes the opening and covers a portion of an outer side of the vehicle fender, said door including an outside panel with a flange portion turned toward the vehicle fender when said door is in the closed position, and including an inside panel;

a seal member, including a door fixing portion having a connecting groove fitted over said door flange portion, and including a lip portion which contacts the vehicle fender when said door is in the closed position.

2. A door seal structure as claimed in claim 1, further comprising a weather strip member fixed to said door inside panel to contact the vehicle fender when said door is in the closed position.

3. A door seal structure as claimed in claim 1, wherein said vehicle fender includes an arch cover member contacted by said lip portion when said door is in the closed position.

4. A door seal structure as claimed in claim 1, wherein:

said seal member further includes a mounting portion;

said door seal structure further comprises a fastener for fastening said mounting portion to said door inside panel; and said seal member further includes a cover portion for covering said mounting portion.

5. A door seal structure as claimed in claim 4, wherein said vehicle fender includes an arch cover member contacted by said lip portion when said door is in the closed position.

6. A door seal member for sealing a door on a vehicle having a fender and having a door mounted on the vehicle for movement between an open position, in which the door provides an opening for access to an interior of the vehicle, and a closed position, in which the door closes the opening and covers a portion of an outer side of the vehicle fender, the door including an outside panel with a flange portion, and an inside panel, said door seal member comprising:

a first mounting portion;

a lip portion cooperating with said first mounting portion to define a connecting groove adapted to be fitted over the door flange portion, bringing said lip portion into contact with the vehicle fender when the connecting groove is fitted over the door flange portion and the door is in the closed position; and a second mounting portion extending from said lip portion on the side thereof opposite said first mounting portion, said second mounting portion having a mounting hole for passage therethrough of a fastener to mount said second mounting portion on the door inside panel.

7. A door seal member as claimed in claim 6, further comprising a cover portion for covering said second mounting portion.

* * * * *